Jan. 31, 1956 T C. NOON 2,732,858
FLOW CONTROLLING APPARATUS
Filed May 23, 1950 2 Sheets-Sheet 1
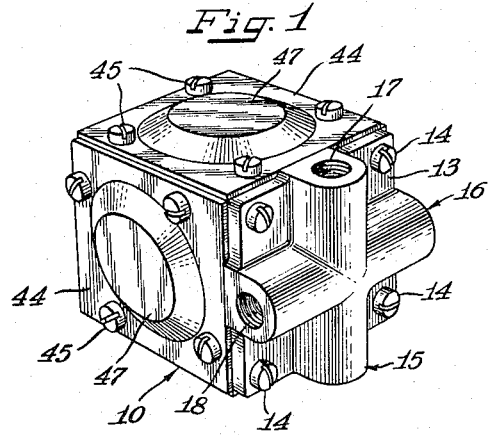
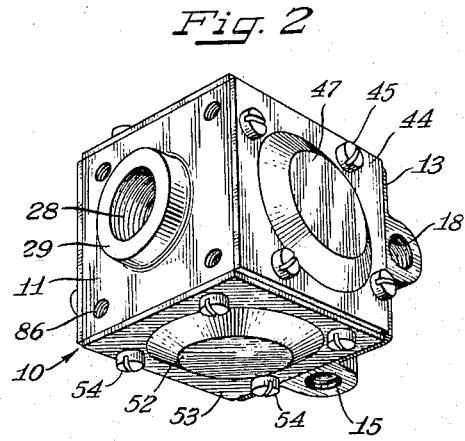
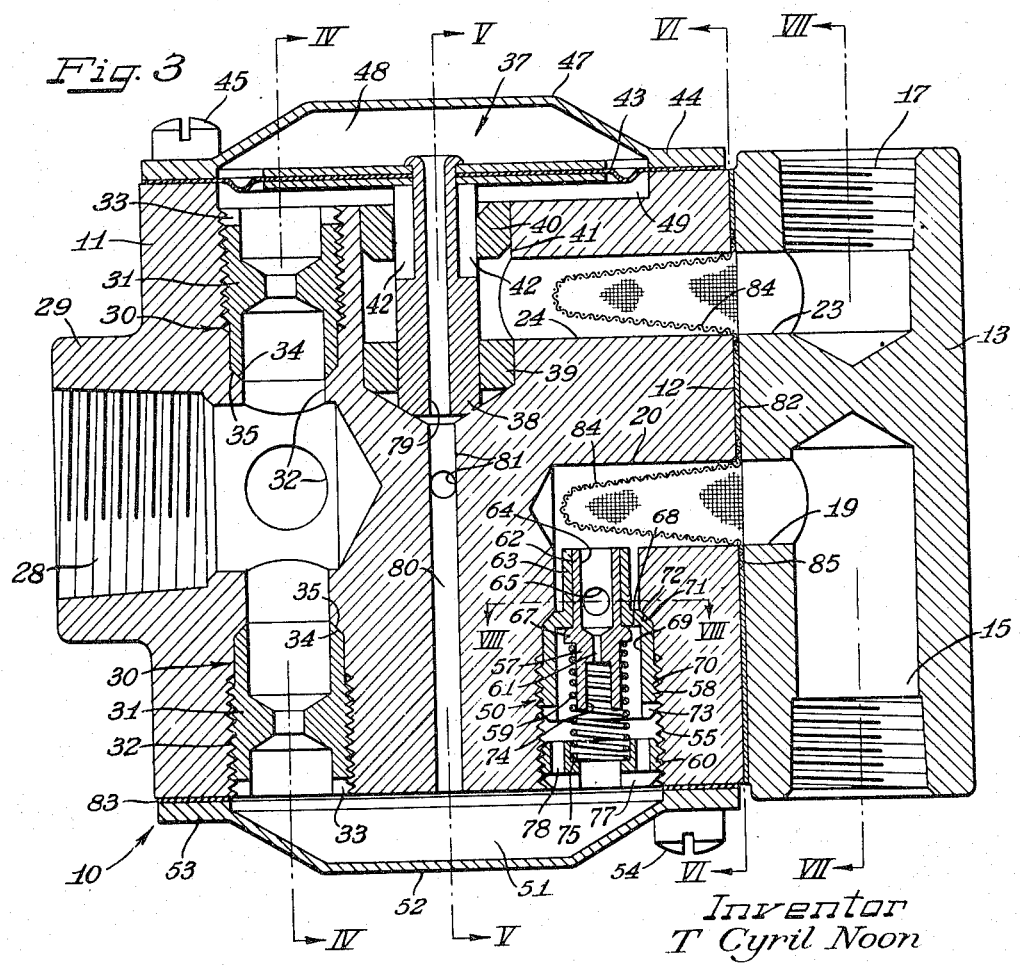
Inventor
T Cyril Noon
by The Firm of Charles Hills Attys Jan. 31, 1956 T C. NOON 2,732,858
FLOW CONTROLLING APPARATUS
Filed May 23, 1950 2 Sheets-Sheet 2
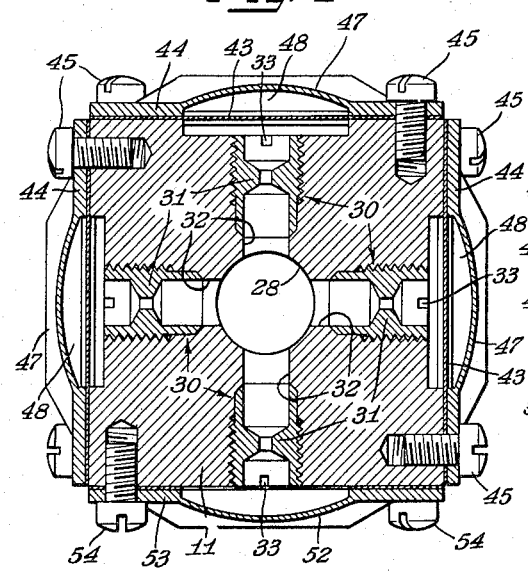
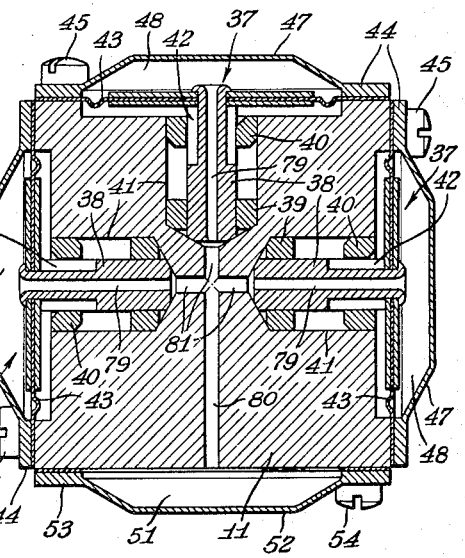
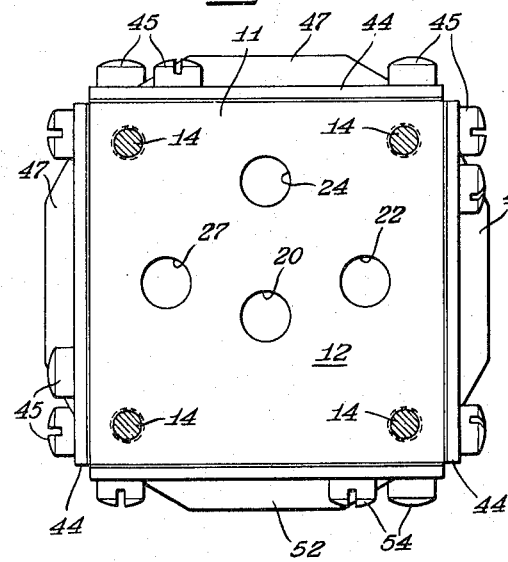
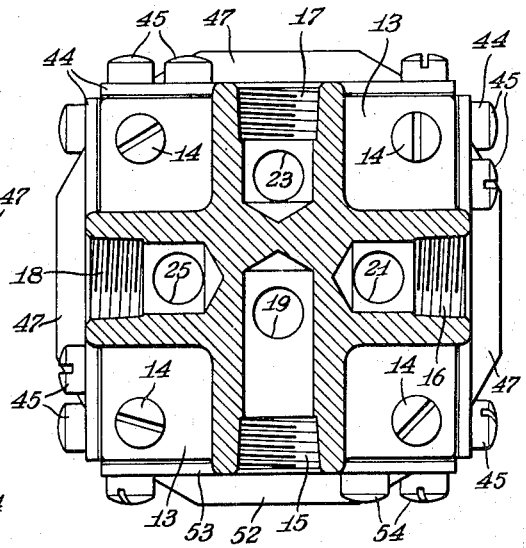
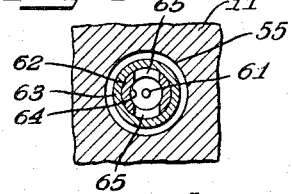
Inventor
T Cyril Noon
by The Firm of Charles W Hills Attys

United States Patent Office 2,732,858
Patented Jan. 31, 1956

2,732,858

FLOW CONTROLLING APPARATUS

T Cyril Noon, Bainbridge Township, Geauga County, Ohio, assignor to Thompson Products, Inc., Cleveland, Ohio, a corporation of Ohio Application May 23, 1950, Serial No. 163,687

4 Claims. (Cl. 137—505.41)

The present invention concerns means for controlling the flow of fluids, and more particularly relates to improved apparatus for equalizing or proportioning the flow of fluid through a plurality of flow passages.

An important object of the present invention is to provide improved diaphragm actuated control valve construction for use with apparatus for controlling the flow of fluid through a plurality of flow paths, such as liquid fuel from a plurality of tanks delivered to a common point such as a manifold, carburetor intake, or the like.

A further object of the invention is to provide an improved diaphragm actuated metering valve construction.

Other objects, features and advantages of the present invention will be readily apparent from the following detailed description of a preferred embodiment thereof, taken in conjunction with the accompanying drawings, in which:

Figure 1 is a perspective view of a fluid flow controlling unit embodying the features of the present invention;

Figure 2 is another perspective view of the unit, but looking generally toward the opposite end from that viewed in Figure 1;

Figure 3 is a median front to rear vertical sectional view through the unit end and on an enlarged scale;

Figure 4 is a reduced scale sectional view taken on substantially the line IV—IV of Figure 3;

Figure 5 is a reduced scale sectional view taken on substantially line V—V of Figure 3;

Figure 6 is a reduced scale sectional view taken on substantially the line VI—VI of Figure 3 and with certain parts omitted for purpose of clarity;

Figure 7 is a sectional view on a reduced scale taken substantially on the line VII—VII of Figure 3; and Figure 8 is a fragmentary detail sectional view taken on substantially the line VIII—VIII of Figure 3.

Certain self-propelled machines carry a plurality of fuel tanks from which the fuel must be fed simultaneously in certain predetermined proportions at an equalized rate. For example, certain air traveling machines require that fuel utilized in the propulsion thereof be delivered from a plurality of fuel tanks at an equal rate so that load conditions will remain balanced. The device illustrated and described is especially suited to so balance the flow rate from a plurality of fuel tanks that the tanks will empty at the same rate.

According to the invention, a flow equalizing or proportioning device 10 is provided which has as a principal component a generally cubical body block 11, to one face of which, herein the rear face identified at 12, is secured a fluid inlet head or port block 13 (Figures 1, 2, 3 and 7). Each of the blocks 11 and 13 may be made from a light weight material such as aluminum alloy and is preferably of minimum dimensions consistent with functional requirements. Screws 14 may be utilized to secure the port block 13 to the body block 11 removably.

Entering the port block 13 is a plurality of fluid ports 15, 16, 17 and 18 (Figures 1, 3 and 7). Herein the respective ports enter from the edges of the port block 13 and are in the form of bores extending into the block short of one another so as to be independent, and each bore may be internally threaded adjacent its mouth for connection thereto of an appropriate fluid duct such as may lead from a respective tank which is the source of fluid for the particular port to which any respective duct leads. While four ports have been shown in the example of the invention under discussion, it is apparent that a greater or smaller number of ports may be used, depending upon practical requirements.

From the respective ports 15 to 18, inclusive, the fluid is directed to the interior of the body block 11. For this purpose a passage 19 leads from the inner end portion of the entry port 15 through the inner wall of the port block 13 to register with a passage 20 opening through the body block rear face 12. Similarly a passage 21 leads from the port 16 through the port block to register with a passage 22 (Figures 6 and 7) in the body block. A passage 23 leads from the port 17 to register with a passage 24 in the body block; and a passage 25 leads from the port 18 to register with a body block passage 27.

Each of the fluid passages 20, 22, 24 and 27 within the body block 11 forms part of a respective flow stream within which the rate of flow is controlled. Ultimately all of the streams are comingled to exit from the body block as a single stream through a front side port 28 which may be defined by a projecting hollow boss 29 and may be internally threaded in the outer portion thereof for connection thereto of a delivery duct from or part of a manifold, delivery duct of a carburetor, or the like.

Herein, the passage 20 forms part of a pilot line or stream duct, while the passages 22, 24, and 27 form parts of respective flow line or stream ducts which are subject to control by the pilot stream. However, each of the streams, immediately before it comingles with the other streams at the port 28, must pass through a respective metering orifice 30 (Figures 3 and 4). Each of these orifices is of fixed restricted cross sectional flow area and comprises a generally cylindrical body member 31 which is externally threaded for threaded engagement in a respective bore 32 extending through the body block 11 from the respective side of the block and communicating with the delivery port 28. Each of the orifice bodies 31 has a driver slot 33 in its outer end and has a frustum tapered shoulder 34 at its inner end which is driven against a complementary shoulder 35 within the bore 32 to delimit the extent to which the orifice body will extend into the bore 32 in fully assembled relation. This assures a tight fit of the orifice bodies 31 in their bores and so that they will not work loose in service. It will thus be seen that each of the fluid flow streams is controlled as to pressure drop by its respective fixed orifice 30 immediately upstream from the port 28. For equalization of flow, each of the orifices 30 is of equal cross sectional flow area. For proportional flow, selected variation in the cross sectional flow area may be provided.

In addition to the fixed metering orifices in the flow streams, each stream is provided, upstream from the fixed orifice 30 therein, with variable orifice means by which the rate of flow is controlled to meet fluctuating fluid demand conditions as well as to control independent fluctuations in flow in the several streams.

In each of the three fluid streams aside from the pilot stream the variable orifice means comprises a throttle valve structure 37 (Figures 3 and 5). In each instance the throttle valve structure includes a valve plug 38 which is reciprocably slidably bearinged in a pair of coaxial, spaced inner and outer bearing sleeves or rings 39 and 40, respectively, which are fitted snugly in an appropriate bore 41 extending in from the center of the respective faces of the body block 11 adjacent to the flow passages 22, 24 and 27, and intersecting such passages for communication therewith. As best seen in Figure 3, the bearing rings 39 and 40 are disposed at respectively inner and outer sides of the flow passage and the throttle valve plug 38 is of a length to extend between and at its opposite ends beyond the bearing rings. The outer end portion of the throttle valve plug 38 is formed with a plurality of longitudinal fluid passage grooves 42 which extend only to a limited predetermined extent inwardly beyond the outer bearing ring 40 when the inner end of the valve plug 38 is seated against the inner end of the bore 41. Thereby, the fluid passage grooves 42 communicate with the space between the bearing rings 39 and 40 and thus with the fluid passages 22, 24 or 27, as the case may be. This permits the fluid from said passages to escape to the respective sides of the body block 11.

At the sides of body block 11, the fluid from the respective passages which passes the respective plug valves 38 is confined by respective diaphragms 43 which are secured centrally to the respective plug valves and marginally to the contiguous sides of the body block 11. In the present instance the marginal clamping means comprise similar closure plates 44 which are secured to the body block 11 by means of screws 45, the tapped bores for receiving the screws in the body block 11 being appropriately spotted to avoid interference with right-angularly disposed screw holes in adjacent faces of the body block.

Each of the clamping plates 44 is centrally domed as at 47 to afford functional clearance for the associated diaphragm 43 and to provide a static pressure chamber 48 at the outer side of the diaphragm. At the inner side of each of the diaphragms, the body block 11 is recessed as indicated at 49 to provide an active pressure chamber into which the fluid issues upstream from the fixed orifice 30 in each instance and within which the fluid pressure is active upon the inner side of the diaphragm 43.

It will thus be evident that fluctuations in the fluid streams which include the passages 22, 24 and 27 will be individually controlled to remain uniform in response to fluid demand through the outlet port 28 since any increase in pressure upstream from the respective metering orifices 30 will be reflected in outward flexing of the respective throttle valve diaphragm 43 and thus restriction of the flow through the fluid channels or grooves 42 in the throttle valve plug body 38. Also, reduction or increase in the pressure drop across the respective fixed orifices 30 will be reflected in increasing or decreasing pressure upstream from the fixed orifices, and live fluid pressure upon the respective diaphragms will fluctuate accordingly to effect appropriate metering of the flow through the variable orifices defined by the throttle valve structures 37.

In the pilot stream which passes through the passage 20 a variable orifice 50 is provided upstream from the fixed orifice 30, and the passage between the spaced fixed and variable orifices is completed by a chamber 51 formed by a central dome 52 of a closure plate 53 secured to the appropriate side of the body block 11 as by means of screws 54. While the orifice bore 32 opens into the passage chamber 51 adjacent the front thereof, a variable orifice bore 55 connecting with the passage 20 opens into the passage chamber 51 adjacent the rear thereof. Through this arrangement, the passage chamber 51 affords a substantial static fluid pressure area between the spaced orifices 30 and 50.

The variable orifice 50 comprises a structure affording a predetermined minimum metered flow of fluid therethrough resulting in a normal substantial pressure drop across the orifice. In addition this orifice assembly includes means for decreasing the pressure drop in response to increased fluid demand by variably increasing the cross sectional flow area through the orifice assembly. To this end, the orifice assembly 50 comprises a longitudinally slidable orifice valve member 57 slidably mounted in a tubular pilot member 58 and biased in one direction by means of a spring 59 seated on a retainer 60. In assembly, the relationship is such that the orifice valve member 57 is normally maintained in a position relative to the pilot member 58 so that fluid from the passage 20 may flow freely only through a quite restricted orifice passage 61 extending axially through the orifice valve member.

In order to afford the variable increase in metered fluid flow through the orifice assembly 50, the orifice valve member 57 has an elongated cylindrical tubular extension 62 which is closely but freely slidable within a tubular portion 63 of the pilot member 58 and has an enlarged diameter bore 64 leading to the small orifice passage 61. Opening through diametrically opposite sides of the tubular extension 62 are a pair of relatively large size orifice openings 65 (Figures 3 and 8). The openings 65 are located in substantially spaced relation to the orifice passage 61 and to an annular shoulder 67 which projects from the base of the tubular portion 62 and is engageable with an opposing shoulder 68 afforded by the inner end of an enlarged diameter bore portion 69 of the pilot member 58. Thereby, the enlarged orifice openings 65 are normally blocked by the encircling tubular portion 63 of the pilot member. However, when the tubular extension 62 of the valve member is slidably moved inwardly within the tubular pilot portion 63 the openings 65 eventually pass inwardly beyond the pilot member shoulder 68 and thus afford opening of variable flow area from the enlarged bore 64 of the valve member into the enlarged bore 69 of the pilot member.

The pilot member 58 is secured within the bore 55 by threaded interengagement, being for this purpose provided with external screw threads 70 at its enlarged end and an intermediate frustum shoulder 71 which is driven tightly against a complementary shoulder 72 within the bore 55, the pilot tubular portion being of smaller diameter than the inner end portion of the bore 55 to afford ample clearance for assembly purposes. By preference the relationship of the shoulders 71 and 72 is such that in the fully assembled relationship the inner end of the pilot member portion 63 is in close proximity to the passage 20. At its outer end, the pilot member 58 may be formed with a driver slot 73.

The spring 59 is preferably a coil compression spring of appropriate weight dimensioned to encircle the body of the orifice valve member 57 and bear at its inner end against the outer side of the annular shoulder portion 67. Outwardly beyond the restricted orifice passage 61, the valve member 57 is preferably formed with a relatively large diametric slot 74 to afford unrestricted fluid passage for escape of fluid from the orifice passage 61 through the encircling coils of the spring.

At its outer end, the spring 59 seats within a seating socket 75 in the retainer 60 which is preferably in the form of an externally threaded ring secured within the threaded bore 55, the outer end of the ring being formed with a driver slot 77 to facilitate assembly. A spaced relation is maintained between the adjacent end of the pilot member 58 and the spring retainer ring 60 and this enables adjustment of tension in the spring 59 for optimum results in operation. In order to afford as completely free flow of fluid through the retainer ring 60 as practicable, it not only has the central bore which communicates with the interior of the spring 59, but also has an annular series of relatively large size fluid passages 78 therethrough for passage of fluid that may escape through the variable orifice openings 65 around the spring when the latter is compressed by action of the fluid pressure on the valve member 57.

During operation of the unit, minimum fluid demands may be met by flow of the fluid through the restricted orifice passage 61. As the demand increases, however, the fluid pressure acting on the valve member 57 overcomes the compression of the spring 59 and slidably drives the valve member outwardly until the variable orifice openings 65 pass the pilot shoulder 68 to the extent which will pass enough fluid through the orifice openings 65 to meet the demand. Fluctuations in demand are thus quickly and accurately met by the responsiveness of the valve member 57 under the control of the spring 59. Of course, there is a maximum flow metering effect attained when the metering openings 65 are fully uncovered, but such flow area is greater than the maximum flow permitted through the metering orifice 30 in the pilot flow path, and there will thus be at all times proper proportional flow or uniformity of flow with respect to the pilot flow path as well as the other flow paths provided by the unit.

In order to render the other fluid flow paths of the unit responsive to variations in flow through the pilot flow path, the static pressure sides of the control valve diaphragms 43, within the static pressure chambers 48, are placed in communication with the static pressure flow passage chamber 51 of the pilot flow path. This is accomplished by having the plug valve members 38 axially bored to provide communication passages 79 which communicate with a duct 80 in the body block 11 opening into the pilot path static pressure chamber 51 and having branches 81 opening into the respective throttle valve bores 41 at the inner ends of the valve plugs 38 (Figures 3 and 5). Through this arrangement, every pressure drop or pressure increase in the pilot path chamber 51 is promptly reflected in all of the other flow paths by action upon the throttle valve diaphragms 43. Thus, when there is a pressure drop in the chamber 51, pressure in the static pressure chambers 48 also drops correspondingly and thus causes the diaphragms 43 to move into the chambers 48 and thus throttle the fluid flow through the passages 42 and the throttle valve plugs accordingly. On the other hand, should the pressure in the chamber 51 increase, this is reflected by increased pressure in the static pressure chambers 48 and tends to drive the diaphragms 48 toward or into the passage chambers 49 and thus increases the flow through the throttle valves. It is thus apparent that not only is each of the fluid flow paths through the unit 10 individually controlled against fluctuations of fluid flow peculiar to any such flow path, but all of the flow paths are equalized with the pilot flow conditions.

It may be observed that in order to avoid leakage of fluid from between the body block 11 and the inlet port block 13, an appropriate gasket 82 is interposed therebetween. For similar reasons a gasket 83 is interposed between the closure plate 53 and the side of the body block against which it is attached. The diaphragms 43 serve as gaskets between the closure plates 44 and the body block.

By preference suitable generally thimble shaped screens 84 are disposed in the passages 20, 22, 24 and 27 for straining foreign matter from the fluid to avoid any interference that might be caused thereby in the successful operation of the unit. Respective lateral flanges 85 at the mouths of the screens are retainingly clamped between the body block 11 and the inlet port block 13. The screens have been omitted in Figure 6 as unnecessary to the disclosure therein.

Means may be provided for attachment of the unit in association with other apparatus with which it may be used. Herein such means comprise an appropriate series of tapped holes 86 for receiving attachment screws in the front face of the body block 11.

It will be understood that modifications and variations may be effected without departing from the scope of the novel concepts of the present invention.

I claim as my invention:

1. In combination in apparatus of the character described, a body, a recess in said body, means closing said recess to define a substantial chamber, a bore in said body communicating with said chamber, and fluid passageway having a portion communicating with said bore and another portion communicating with said chamber and said portions together with said chamber and said bore affording a continuous fluid stream pathway delivering fluid to the chamber in one part of the passageway and discharging fluid from the chamber in the remaining part of the passageway, spaced bearing rings in said bore affording therebetween a chamber into which leads said portion of the passageway communicating with the said bore, a throttle valve plug longitudinally guided by said bearing rings and having grooves cooperating with the outer of said bearing rings in metering relation, and a diaphragm secured across said recess and inside said closing means and secured to said valve plug and being responsive to pressure of fluid thereagainst for varying the throttling relationship of said grooves to said outer bearing ring by moving said valve plug, said valve plug having a pressure passage axially therethrough leading to the side of the diaphragm opposite said recess and said body having a further fluid passage communicating with the inner end portion of the bore and through said pressure passage through the plug with the side of the diaphragm opposite the recess.

2. In combination in a flow controlling apparatus, means providing a closed chamber, a diaphragm dividing said chamber, a first fluid passage bore in said means opening into said chamber coaxial with the diaphragm, a second fluid passage bore in said means intersecting the first bore, a pair of bearing rings of smaller internal diameter than the bore and inserted in and respectively disposed in the first bore in axially spaced relation at opposite sides of said second bore intersection, said means having a passage in addition to said bores communicating with said chamber and cooperating therethrough with said first and second bores to afford a continuous flow passage for fluid through said chamber on the side of the diaphragm adjacent said first fluid passage bore, and a valve plug secured to said diaphragm and slidably guided by said rings, the valve plug having a fluid passage groove cooperating with the outer one of said rings in fluid metering relation, said first bore having a shoulder inwardly from the intersection and inwardly from the inner of said rings providing a seat for the inner end of the plug, said shoulder having a passage opening therethrough and the valve plug having a bore therethrough registering with this passage and opening to the opposite side of the diaphragm to that from which the plug extends, said inner of said rings blocking communication between said second bore and the last mentioned passage.

3. In a flow controlling apparatus, a solid body block, a bore opening from one side of said block, means cooperating with said side of said block to provide a chamber, a diaphragm dividing said chamber into dynamic fluid and static fluid portions, a valve stem projecting from said diaphragm through the dynamic pressure portion of the chamber into said bore, spaced bearing means guiding said valve stem reciprocably, a fluid passage in said body block communicating with said bore between said guide bearing means, valve metering means on said valve stem cooperating with the bearing means nearest said chamber for metering fluid passing between said dynamic pressure portion and said passage, a passage communicating with said dynamic pressure portion and cooperating with said bore and said first mentioned passage to provide a dynamic fluid passageway controlled by said metering means on the valve stem, and said body block having a further passage communicating with the end of said valve stem remote from the diaphragm and blocked from said passageway by the bearing means remote from said diaphragm, said valve stem having a passage therethrough effecting communication with said further passage and said static pressure portion of the chamber.

4. In a flow controlling apparatus, means providing a closed chamber, a diaphragm dividing said chamber, said diaphragm having a valve plug extending therefrom, said means providing a bore into which said plug extends, bearing means in said bore at longitudinally spaced positions, said means providing a fluid passage communicating with said bore between said bearing means, said valve plug having metering means cooperating with the bearing means nearest the diaphragm for metering fluid to pass between said chamber and said passage on the valve plug side of said diaphragm, another passage communicating with said valve plug side of the diaphragm to effect a continuous flow passage through said passages and said bore and the metering means of the valve plug, said bearing means remote from the diaphragm blocking flow to the end of the valve plug remote from the diaphragm, and means providing a fluid passage communicating with said remote end of the valve plug, said valve plug having a passage therethrough to the side of the diaphragm remote from the valve plug and thereby effecting communication with said remote side of the diaphragm and the last mentioned fluid passage.

References Cited in the file of this patent

UNITED STATES PATENTS

| Number | Name | Date |
|---|---|---|
| 1,267,809 | Shurtleff | May 28, 1918 |
| 1,287,119 | Shurtleff | Dec. 10, 1918 |
| 1,582,896 | Berry | May 4, 1926 |
| 1,638,110 | Garrey | Aug. 9, 1928 |
| 1,843,953 | McKinney | Feb. 9, 1932 |
| 2,042,523 | Graham | June 2, 1936 |
| 2,220,229 | Grove | Nov. 5, 1940 |
| 2,316,944 | Ernst | Apr. 20, 1943 |
| 2,459,664 | Majneri | Jan. 18, 1949 |
| 2,485,504 | Morgan | Oct. 18, 1949 |